(12) United States Patent
Heath et al.

(10) Patent No.: US 10,173,349 B2
(45) Date of Patent: Jan. 8, 2019

(54) BLADDER THAT CHANGES STIFFNESS BASED ON TEMPERATURE EFFECTS FOR MANUFACTURE OF COMPOSITE COMPONENTS

(71) Applicant: The Boeing Company, Chicago, IL (US)

(72) Inventors: Edward Heath, Mount Pleasant, SC (US); Samuel Knutson, Charleston, SC (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 15/002,687

(22) Filed: Jan. 21, 2016

(65) Prior Publication Data

US 2017/0210038 A1    Jul. 27, 2017

(51) Int. Cl.
*B29C 33/50* (2006.01)
*B29C 33/40* (2006.01)

(52) U.S. Cl.
CPC ............ *B29C 33/505* (2013.01); *B29C 33/40* (2013.01); *B29K 2995/0008* (2013.01)

(58) Field of Classification Search
CPC ................................ B29C 33/50; B29C 33/76
See application file for complete search history.

(56) References Cited

U.S. PATENT DOCUMENTS

| | | |
|---|---|---|
| 3,425,642 A | 2/1969 | May |
| 5,366,684 A | 11/1994 | Corneau, Jr. |
| 7,252,313 B2 | 8/2007 | Browne et al. |
| 7,357,166 B2 | 4/2008 | Pham et al. |
| 7,530,530 B2 | 5/2009 | Engwall et al. |
| 7,608,197 B2 | 10/2009 | Bose et al. |
| 8,210,547 B2 | 6/2012 | Wood |
| 8,293,051 B2 | 10/2012 | Morris et al. |
| 8,430,984 B2 | 4/2013 | Lee et al. |
| 8,696,610 B2 | 4/2014 | Solomon et al. |
| 8,800,953 B2 | 8/2014 | Morris et al. |
| 8,945,325 B2 | 2/2015 | Everhart et al. |
| 8,974,217 B2 | 3/2015 | Everhart et al. |
| 9,643,379 B1 * | 5/2017 | McKnight ................ B32B 3/14 |
| 2005/0211870 A1 * | 9/2005 | Browne ................ B29C 33/308 249/134 |
| 2005/0212630 A1 * | 9/2005 | Buckley ........... A61B 17/12022 335/35 |

* cited by examiner

*Primary Examiner* — Edmund H Lee
*Assistant Examiner* — Nicholas R Krasnow
(74) *Attorney, Agent, or Firm* — McDonnell Boehnen Hulbert & Berghoff LLP

(57) ABSTRACT

Within examples, elastomeric apparatuses for use in manufacture of a composite component, and methods for altering a surface rigidity of an elastomeric apparatus for use in manufacture of a composite component are described. In one example, an elastomeric apparatus comprises an elastomer housing, and a plurality of magnets within the elastomer housing at predetermined positions to provide surface rigidity to the elastomer housing based on one or more alignments of certain magnets of the plurality of magnets due to magnetic forces. An increase in temperature causes a loss in one or more of the magnetic forces of one or more of the plurality of magnets resulting in a reduction of stiffness of the elastomer housing at corresponding predetermined positions.

20 Claims, 8 Drawing Sheets

ROOM TEMPERATURES

ELEVATED TEMPERATURES

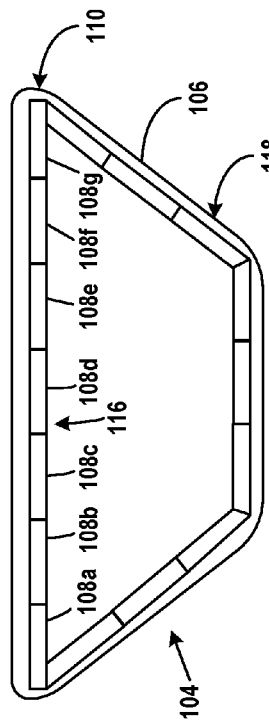
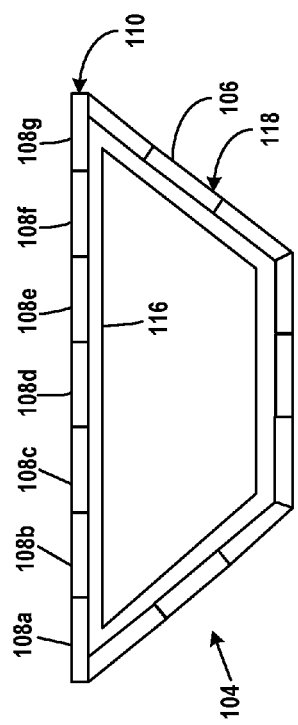
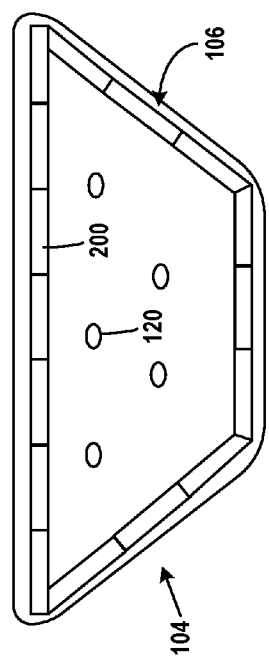
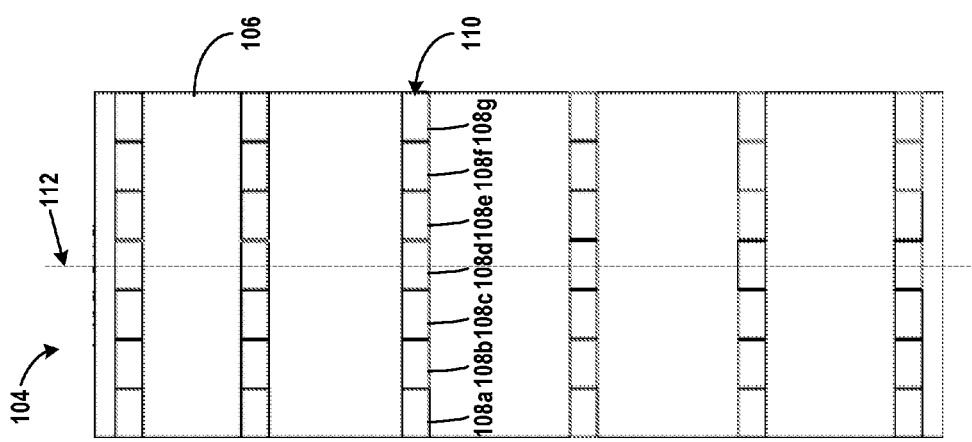

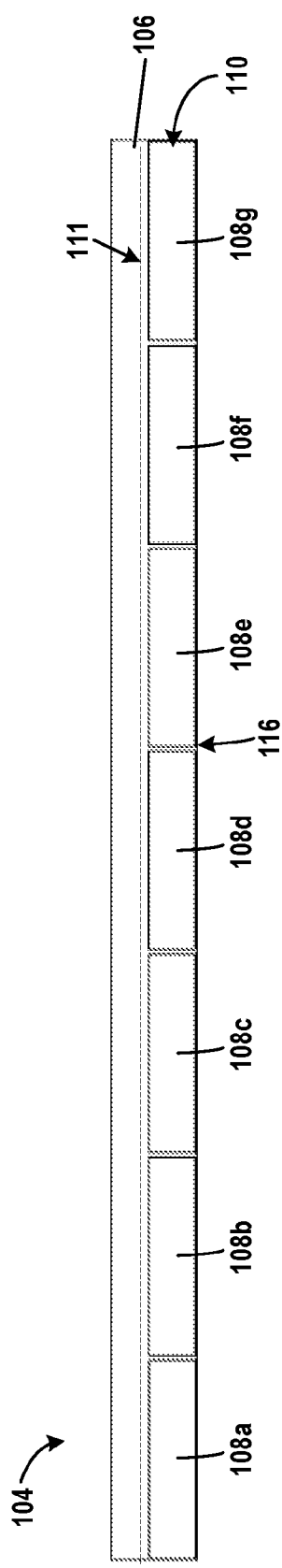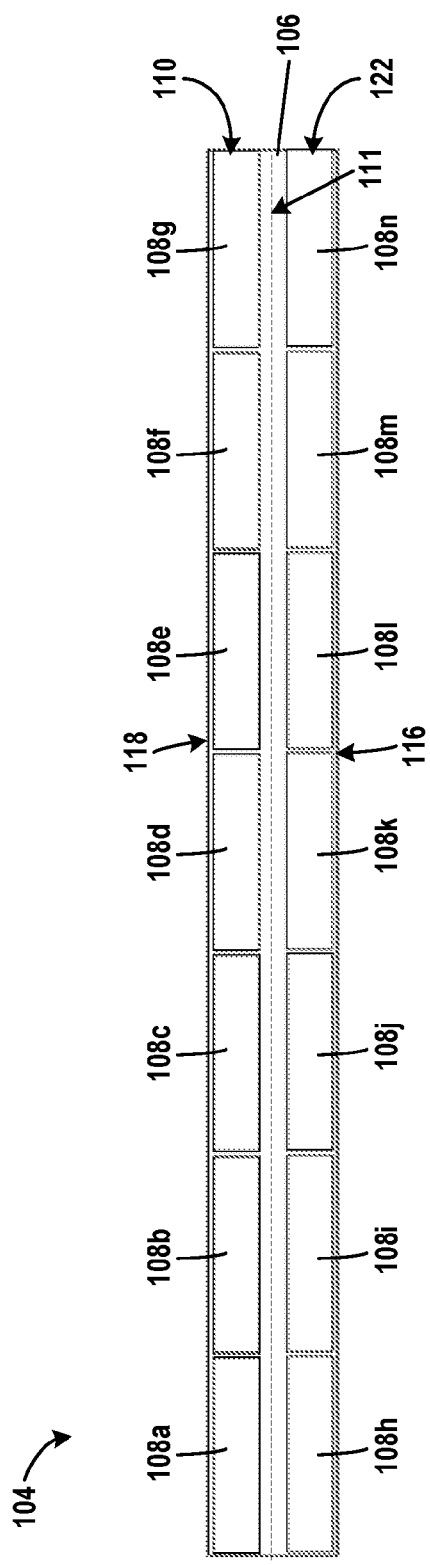

BLADDER THAT CHANGES STIFFNESS BASED ON TEMPERATURE EFFECTS FOR MANUFACTURE OF COMPOSITE COMPONENTS

FIELD

The present disclosure generally relates to methods and equipment for fabricating composite resin parts, and more particularly to a bladder or mandrel tool used in curing composite parts that changes stiffness based on temperature and magnetization.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines or other automated lamination equipment may be used to place fiber reinforcements on molds or mandrels to form composite layups. Following, composite parts may be cured within an autoclave that applies heat and pressure to the part during a cure cycle.

Some composite part geometries include internal cavities that may cause the part to collapse under application of composite material or autoclave pressure unless a tool such as a bladder or mandrel tool is placed in the cavity.

Many types of mandrel tools exist. One example type is a semi-rigid tool in which tooling is used that is not as stiff as is desirable at room temperature and/or not as flexible as desirable at elevated temperatures. Another example type is a fully-rigid tool in which tooling is used that is rigid through the entire fabrication process, however, the tooling may have limited ability to conform to the composite part so as to distribute pressure evenly during the curing process. Still other mandrel tools exist that include shape memory polymers (SMP). SMP materials allow rigid tooling at room temperature that becomes flexible at elevated temperatures, however, SMP's require an expensive secondary manufacturing step to reheat and reform (e.g., blow mold) the SMP's to an original rigid geometry after each use for re-use of the tool.

Accordingly, there is a need for a bladder design that will allow the bladder to be rigid during automated lamination that will also allow the bladder to be flexible during the curing cycle.

SUMMARY

In one example, an elastomeric apparatus for use in manufacture of a composite component is described. The elastomeric apparatus comprises an elastomer housing, and a plurality of magnets within the elastomer housing at predetermined positions to provide surface rigidity to the elastomer housing based on one or more alignments of certain magnets of the plurality of magnets due to magnetic forces. An increase in temperature causes a loss in one or more of the magnetic forces of one or more of the plurality of magnets resulting in a reduction of stiffness of the elastomer housing at corresponding predetermined positions. In some examples, the increase in temperature causes the loss in one or more of the magnetic forces of one or more of the plurality of magnets related to a magnetic Curie point of a material of the plurality of magnets.

In another example, a method for altering a surface rigidity of an elastomeric apparatus for use in manufacture of a composite component is described. The method comprises providing a housing of the elastomeric apparatus having a plurality of magnets at predetermined positions to provide a surface rigidity state to the housing based on one or more alignments of certain magnets of the plurality of magnets due to magnetic forces. The method also comprises changing the surface rigidity state of the housing based on an increase in temperature associated with processing of a composite component, and the temperature change causes a loss in one or more of the magnetic forces of one or more of the plurality of magnets resulting in a reduction of stiffness of the housing at corresponding predetermined positions.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 3 illustrates a top view of the elastomeric apparatus for use in manufacture of a composite component, according to an example embodiment.

FIG. 4 illustrates a side view of the elastomeric apparatus for use in manufacture of a composite component, according to an example embodiment.

FIG. 5 illustrates another side view of the elastomeric apparatus for use in manufacture of a composite component, according to an example embodiment.

FIG. 6 illustrates another side view of the elastomeric apparatus for use in manufacture of a composite component, according to an example embodiment.

FIG. 7 illustrates a side view of a portion of the elastomeric apparatus for use in manufacture of a composite component, according to an example embodiment.

FIG. 8 illustrates another side view of a portion of the elastomeric apparatus for use in manufacture of a composite component, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, elastomeric apparatuses for use in manufacture of a composite component, and methods for altering a surface rigidity of an elastomeric apparatus for use in manufacture of a composite component are described. In one example, an elastomeric apparatus comprises an elastomer housing, and a plurality of magnets within the elastomer housing at predetermined positions to provide surface rigidity to the elastomer housing based on one or more alignments of certain magnets of the plurality of magnets due to magnetic forces. An increase in temperature causes a loss in one or more of the magnetic forces of one or more of the plurality of magnets resulting in a reduction of stiffness of the elastomer housing at corresponding predetermined positions.

Examples described herein utilize an effect of magnetic strength loss at elevated temperature to reduce structure rigidity at the elevated temperatures. With the apparatus including magnet components or pieces oriented within the apparatus in such a way that at room temperature a rigid cross-section is created due to the magnetic forces, then at elevated temperatures experienced during curing of parts the magnetic field dissipates due to Curie temperature effects and the apparatus becomes flexible allowing the cross-section to conform and expand to a desired part geometry. Thus, a rigid or stiff cross-section is provided at room temperature and a flexible cross-section is provided at elevated temperatures. Based on a type of magnetic components selected, during subsequent cooling of the parts, the magnetic field may either recover making the apparatus cross-section rigid again, or remain reduced to allow extraction of the apparatus and then re-magnetization of the apparatus prior to a next use.

The apparatus may be used as a rigid tool to layup composite laminate parts at room temperature, and then during high temperature cure of the parts, it may be desirable to have the tool become flexible to conform and evenly distribute pressure across the parts. Thus, in some examples, depending on specific manufacturing uses, a natural state of the tool might be normally rigid due to the magnetic forces and at elevated temperatures to be flexible or soft.

Figure 1:
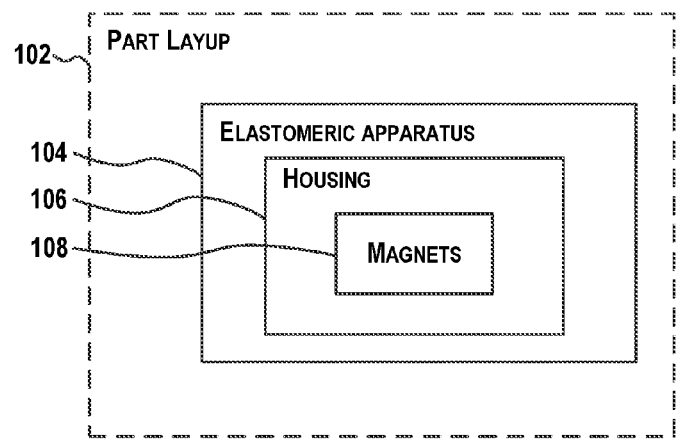
FIG. 1 illustrates an example system including an elastomeric apparatus used to form and/or cure a part layup comprising multiple plies of fiber reinforced polymer resin, according to an example embodiment.

Referring now to FIG. 1, an elastomeric apparatus 104 may be used to form and/or cure a part layup 102 comprising multiple plies (not shown) of fiber reinforced polymer resin. For example, multiple plies of fiber reinforced polymer plies are laid up over the elastomeric apparatus 104 in order to form the plies into a desired part shape. The part layup 102 may partially or fully surround the elastomeric apparatus 104, such that the elastomeric apparatus 104 is at least substantially enclosed by the part layup 102. The elastomeric apparatus 104 includes a flexible housing 106 forming an enclosure that may collapse inwardly when the flexible elastomeric apparatus 104 is placed into a flexible state to allow the elastomeric apparatus 104 to be withdrawn from the part layup 102 either after the layup is compacted and/or cured. Further, the elastomeric apparatus 104 may be flexible during cure of the part layup 102 to react to autoclave conditions (e.g., changing pressure) and to provide internal compaction (i.e., on an inside radius of the part layup 102). The flexible elastomeric apparatus 104 further includes magnets 108 that are configured to align within the housing 106 of the flexible elastomeric apparatus 104. The magnets 108 can be configured to restrain the flexible elastomeric apparatus 104 against deformation as the part layup 102 is applied so as to provide a rigid structure due to magnetic forces.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The elastomeric apparatus 104 may be a mandrel, a bladder, or other structural component for curing the part layup 102. To enable flexibility of the elastomeric apparatus 104, the housing 106 has a flexible surface state and a rigid surface state based on alignment of the magnets 108.

The magnets 108 may be permanent magnets including any kind of magnetic material such as neodymium-iron-boron or any of the rare Earth magnets. The magnets 108 may be separate solid components included in walls of the housing 106 (such as individual pieces of magnet material), and may be homogeneously positioned within a surface of the housing 106 in a predetermined manner. The magnets 108 may include magnetic pieces of materials embedded in the elastomer housing 106 with a diameter of 0.050", for example. Smaller or larger pieces of material may be used depending on the type of material, strength of magnetic properties, and number of pieces used, for example.

Any type of magnets may be used for the magnets 108. The magnets 108 may also be structures that are disposed within, but are separate from the housing 106.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the flexible elastomeric apparatus 104 to form the part layup 102 is illustrated in FIG. 2.

Figure 2:
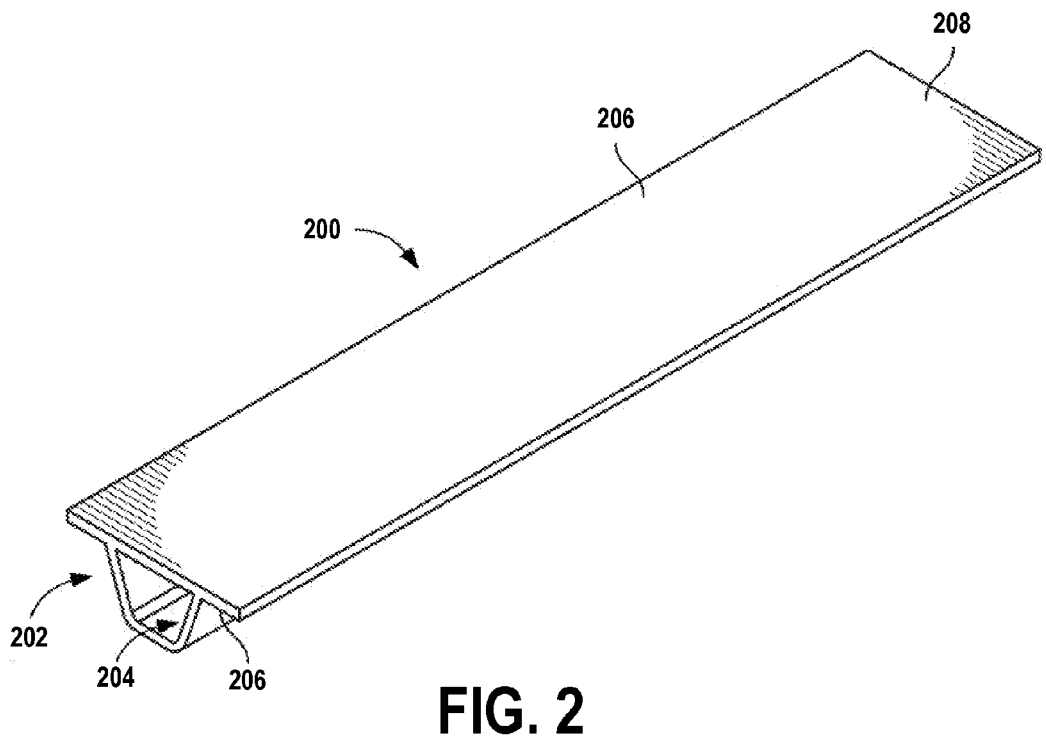
FIG. 2 illustrates an example of a composite component that may benefit from use of the flexible elastomeric apparatus of FIG. 1 to form the part layup, according to an example embodiment.

In FIG. 2, the disclosed flexible apparatus and curing method may be employed to cure a variety of composite resin parts of various geometries, having one or more internal cavities. For example, and without limitation, the disclosed flexible apparatus and curing method may be used in fabrication of a fiber reinforced composite resin stringer 200. In one arrangement, the stringer 200 may comprise a multi-ply layup of prepreg. In the illustrated arrangement, the stringer 200 comprises a hat section 202 forming an internal stringer cavity 204, a pair of laterally extending flange sections 206, and a substantially flat skin section 208 that is consolidated together with the flange sections 206 during curing. As those of ordinary skill in the art will recognize, alternative stringer geometries are possible.

The stringer 200 may be fabricated using the flexible elastomeric apparatus 104 in FIG. 1 by applying the part layup 102 to the elastomeric apparatus 104. After curing, the part layup 102 forms the stringer 200. The flexible elastomeric apparatus 104 fills the stringer cavity 204 that is a hollow trapezoidal space. The flexible elastomeric apparatus 104 functions to react a force of a lamination head during application of the part layup 102, and so the flexible elastomeric apparatus 104 may be rigid to react to loads during skin lamination, and flexible to be removed after cure. In some examples, the flexible elastomeric apparatus 104 may be removed at room temperature, and so the flexible elastomeric apparatus 104 may not necessarily be in a fully flexible state for removal.

In another embodiment, the stringer 200 is preformed and is uncured. The elastomeric apparatus 104 is positioned within the stringer cavity 204 and has a shape that substantially conforms to the corresponding stringer cavity 204 such that the elastomeric apparatus 104 may provide support to the stringer 200 during curing. The elastomeric apparatus 104 of the illustrated embodiment has a trapezoidal shape to conform to a hat-shaped stringer 200, although the elastomeric apparatus could have any number of other shapes to conform to differently shaped stringers.

The elastomeric apparatus 104 may be formed of any elastomeric material, such as Teflon® (E.I. du Pont de Nemours and Company) coated silicone or hard rubber, and may be pliable to enable the elastomeric apparatus 104 to conform to various configurations. The elastomeric apparatus 104 may be formed, for example and without limitation, from flexible silicon rubber and the housing 106 may be an elastomer housing.

Example composite material used for the stringer 200 may be generally a lightweight material, such as an uncured pre-impregnated reinforcing tape or fabric (i.e., "prepreg").

The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the elastomeric apparatus 104 (or mold) to pre-form the tape or fabric into a desired shape of the stringer 200 as defined by the elastomeric apparatus 104. The stringer 200 could be any suitable dimension to provide various degrees of reinforcement, and could comprise any number of plies of prepreg tape or fabric.

FIG. 3 illustrates a top view of the elastomeric apparatus 104 for use in manufacture of a composite component, according to an example embodiment. The elastomer housing 106 is shown to include many magnets arranged in horizontal rows, such as row 110. The plurality of magnets 108a-108g in the row 110, among other magnets in other rows, are oriented within the elastomer housing 106 at predetermined positions such that alignments between the magnets due to magnetic forces provide a rigid cross section of the elastomeric apparatus 104. As shown in FIG. 3, the plurality of magnets 108a-108g are oriented within the elastomer housing 106 at the predetermined positions such that alignments are linearly perpendicular to a centerline 112 of the elastomeric apparatus 106. Between rows of the magnets are elastomer only regions. Any number of magnets may be included in the row 110 depending on a size of the magnets 108a-g and width of the row 110.

The magnets 108a-g are arranged with poles all pointing in same direction so that each magnet 108a-g is attracted to each other to provide the row 110 of magnets lined up that acts as internal structure of the elastomer housing 106. For example, the plurality of magnets 108a-g are within the elastomer housing 106 at predetermined positions to provide surface rigidity to the elastomer housing 106 based the alignments of certain magnets of the plurality of magnets 108a-g due to magnetic forces. Within examples described below, an increase in temperature causes a loss in one or more of the magnetic forces of one or more of the plurality of magnets 108a-g resulting in a reduction of stiffness of the elastomer housing 106 at corresponding predetermined positions.

FIG. 4 illustrates a side view of the elastomeric apparatus 104 for use in manufacture of a composite component, according to an example embodiment. As shown in FIG. 4, the elastomeric apparatus 104 includes an inner surface 116 and an outer surface 118, and the magnets 108a-g are included within the elastomer housing 106 along the inner surface 116 of the elastomer housing 104. In addition, as shown in FIG. 4, the elastomer housing 106 is a trapezoidal shape, and magnets are included along the inner surface 116 of all sides of the elastomer housing 106 in a concentric manner. Although only one concentric arrangement of magnets is shown in FIG. 4 due to the side view, many concentric arrangements may be included along a length of the elastomer housing 106.

In other examples, the elastomer housing 106 may be a rectangular shape or a rounded hat shape. Still other shapes of the elastomer housing 106 are possible depending on application of the elastomeric apparatus 104.

In further other examples, a row of magnets may be included only along one wall or side of the elastomer housing 106, or only along selected walls or sides of the elastomer housing 106.

FIG. 5 illustrates another side view of the elastomeric apparatus 104 for use in manufacture of a composite component, according to an example embodiment. In FIG. 5, the elastomer housing 106 includes the inner surface 116 and the outer surface 118, and the plurality of magnets 108a-g are included within the elastomer housing 106 along the outer surface 118 of the elastomer housing 106. In this configuration, the outer surface 118 may be an outside surface of the elastomer housing 106.

In FIGS. 4-5, the elastomer housing 106 is shown to be a solid (or mostly solid), non-vented elastomer tool with the magnets arranged to provide additional cross sectional stiffness at lower temperatures.

FIG. 6 illustrates another side view of the elastomeric apparatus 104 for use in manufacture of a composite component, according to an example embodiment. In FIG. 6, the elastomer housing 106 includes vents, such as vent 120, within a wall of the elastomer housing 106. The vent 120 provides some airflow within the elastomer housing 106 enabling some additional flexibility during curing of the composite component, for example. For instance, the vent 120 may be an open gap to account for thermal expansion.

FIG. 7 illustrates a side view of a portion of the elastomeric apparatus 104 for use in manufacture of a composite component, according to an example embodiment. FIG. 7 illustrates the magnets 108a-g arranged along the inner surface 116 similar to the embodiment shown in FIG. 4.

The elastomer housing 106 is shown to include an interior wall 111, which acts to hold the magnets 108a-g in place between the interior wall 111 and the inner surface 116. The interior wall 111 may be of the same material as the inner surface 116, such as rubber, or may be comprised of a thinner material. The interior wall 111 may compress the magnets 108a-g against the inner surface 116 to hold them in place.

FIG. 8 illustrates another side view of a portion of the elastomeric apparatus 104 for use in manufacture of a composite component, according to an example embodiment. In FIG. 8, the magnets 108a-g are included within the elastomer housing 106 along the outer surface 118 within the row 110 and additional magnets 108h-n are included along the inner surface 116 within a row 122 of the elastomer housing 106 with the interior wall 111 between the two rows 110 and 122. Here, multiple sets of magnets are biased to both the inner surface 116 and the outer surface 118 of the elastomer housing 106 to provide additional stiffness/structure.

A thickness of a wall of the elastomer housing 106 may be between about 0.100" to 0.250", and a size of the magnets can be selected based on an arrangement along the inner surface 116, the outer surface 118, or both the inner surface 116 and the outer surface 118. In some examples, the magnets 108a-g may be positioned within the elastomer housing 106 and allowed to be biased anywhere along a cross-section of the elastomer housing 106 with the interior wall 111 being present or removed.

Figure 9:
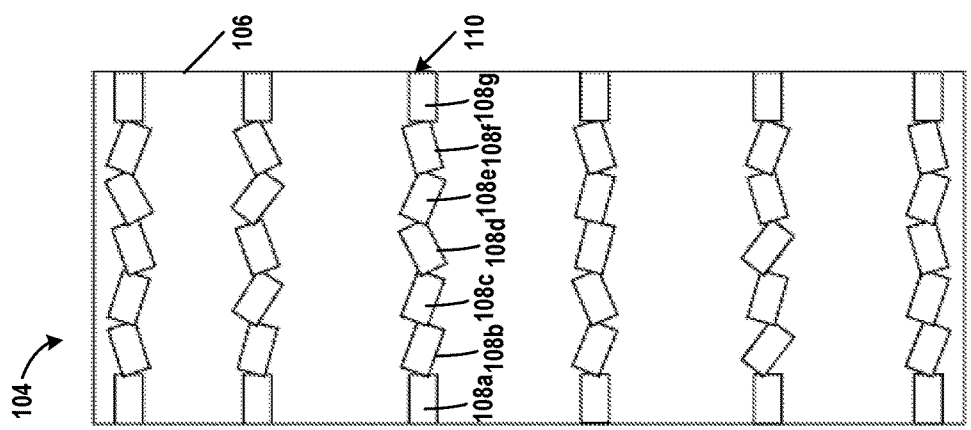
FIG. 9 illustrates a top view of the elastomeric apparatus for use in manufacture of a composite component, according to an example embodiment.

FIG. 9 illustrates a top view of the elastomeric apparatus 104 for use in manufacture of a composite component, according to an example embodiment. FIG. 9 illustrates an arrangement of the magnets 108a-g with an increase in temperature, which causes a loss in one or more of the magnetic forces of one or more of the magnets 108a-g related to a magnetic Curie point of a material of the magnets 108a-g. With the loss of magnetic forces, the magnets 108a-g are no longer aligned in a parallel manner, and do not provide a rigid surface for the elastomer housing 106.

In FIG. 3, the magnets 108a-g are shown to provide a surface rigidity to the elastomer housing 106, such as at room temperature (e.g., between about 65° F. to about 75° F. degrees). In this manner, the magnets 108a-g provide a stiff cross-section of the elastomer housing 106 at room temperature. However, as shown in FIG. 9, at elevated temperatures, the magnets 108a-g are flexibly coupled and provide a flexible cross-section.

Figure 10:
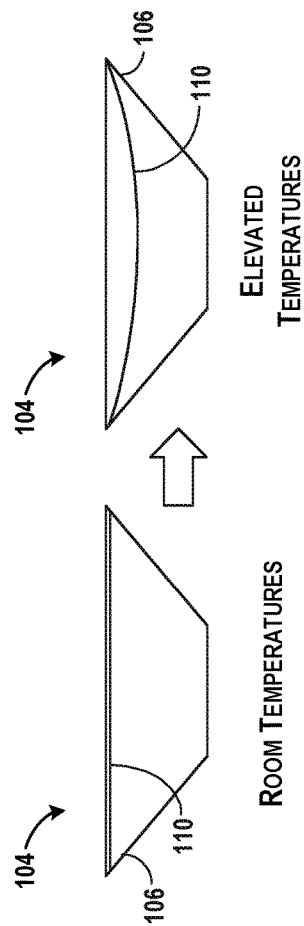
FIG. 10 illustrates a side view of the elastomeric apparatus for use in manufacture of a composite component in operation at room temperatures and elevated temperatures, according to an example embodiment.

FIG. 10 illustrates a side view of the elastomeric apparatus 104 for use in manufacture of a composite component in operation at room temperatures, according to an example embodiment. In FIG. 10, the row 110 of magnets is shown to be configured as a rigid structure due to magnetic forces present at room temperatures. Although only a top side of the elastomeric apparatus 104 is shown to include magnets at the row 110, such that only the top surface loses rigidity at high temperatures, other sides of the elastomeric apparatus 104 may also include rows of magnets and would act in the same manner as well. FIG. 10 illustrates another side view of the elastomeric apparatus 104 for use in manufacture of a composite component in operation at elevated temperatures, according to an example embodiment. As shown in the right side of FIG. 10, the row 110 is flexible due to loss of the magnetic forces between the magnets due to the increased temperatures. The elastomer housing 106 may then be flexible due to no rigid internal structures.

Figure 11:
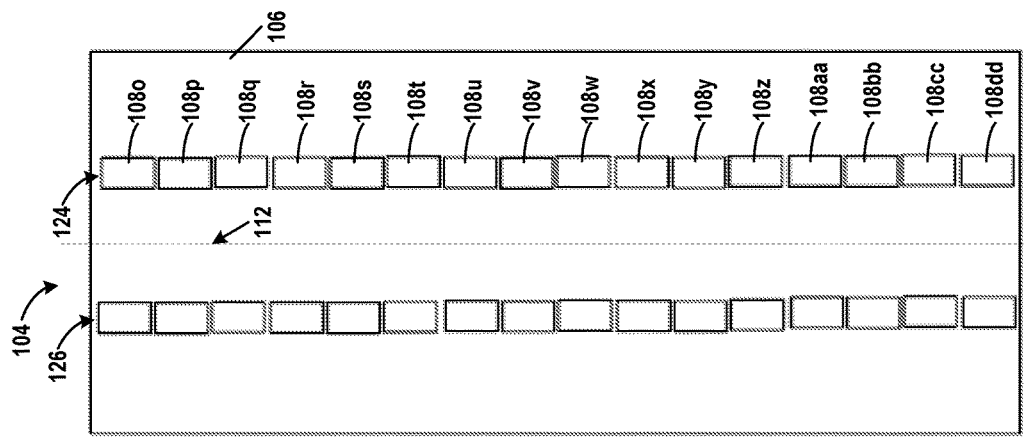
FIG. 11 illustrates another top view of the elastomeric apparatus for use in manufacture of a composite component, according to an example embodiment.

FIG. 11 illustrates another top view of the elastomeric apparatus 104 for use in manufacture of a composite component, according to an example embodiment. In FIG. 11, magnets 108o-dd are oriented within the elastomer housing 106 at predetermined positions such that one or more alignments between the magnets 108o-dd are linearly parallel to the centerline 112 of the elastomeric apparatus 104. FIG. 11 shows two rows 124 and 126 of magnets, and in this configuration, the rows 124 and 136 of magnets provide longitudinal stiffness to the elastomer housing 106 at low or room temperatures.

Figure 12:
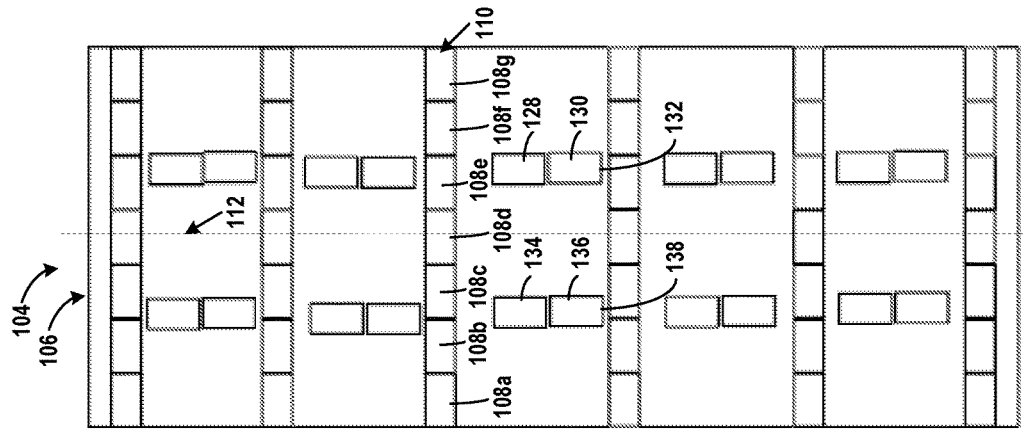
FIG. 12 illustrates another top view of the elastomeric apparatus for use in manufacture of a composite component, according to an example embodiment.

FIG. 12 illustrates another top view of the elastomeric apparatus 104 for use in manufacture of a composite component, according to an example embodiment. In FIG. 12, the magnets 108a-g are arranged in the row 110, similar to as shown in FIG. 3, such that the magnets 108a-g are linearly perpendicular to the centerline 112. FIG. 12 also illustrates additional magnets 128 and 130 in a column 132 oriented within the elastomer housing 106 at additional predetermined positions forming additional alignments that are linearly parallel to the centerline 112 of the elastomeric apparatus 104, and the column 132 is provided between rows of magnets that form the linearly perpendicular alignments. A second column 138 of magnets 134 and 136 is provided as well. Any number of linearly parallel alignments of magnets may be provided as columns between rows of the linearly perpendicular alignments. In some examples, the linearly parallel alignments of magnets may be provided along a length of the elastomer housing 106 between rows of linearly perpendicular alignments.

Figure 13:
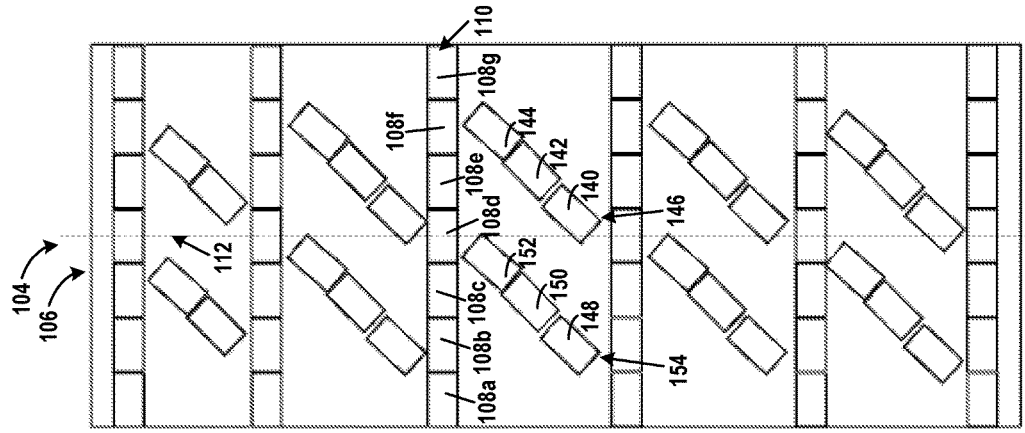
FIG. 13 illustrates another top view of the elastomeric apparatus 104 for use in manufacture of a composite component, according to an example embodiment.

FIG. 13 illustrates another top view of the elastomeric apparatus 104 for use in manufacture of a composite component, according to an example embodiment. In FIG. 13, the magnets 108a-g are arranged in the row 110, similar to as shown in FIG. 3, such that the magnets 108a-g are linearly perpendicular to the centerline 112. FIG. 13 also illustrates additional magnets 140, 142, and 144 oriented within the elastomer housing 106 at additional predetermined positions forming an additional alignment 146 that is diagonal to the centerline 112 of the elastomeric apparatus 104, and the additional diagonal alignment 146 is provided between the magnets forming the linearly perpendicular alignments. A second diagonal alignment 154 of magnets 148, 150, and 152 is provided as well. Any number of diagonal alignments of magnets may be provided between rows of the linearly perpendicular alignments. In some examples, the diagonal alignments of magnets may be provided along a length of the elastomer housing 106 between rows of linearly perpendicular alignments.

As shown in the configurations in FIGS. 12 and 13, additional alignments of magnets may be provided between rows of linearly perpendicular alignments for additional stabilizer structures for the elastomer housing 106.

Using the elastomeric apparatus 104, stiffness of the elastomer housing 106 may be altered at predetermined positions in relation to a magnetic field based on a temperature change associated to a cure cycle of the composite part. In operation, a specific orientation arrangement of magnets is used to generate a predetermined magnetic flux field and force such that a stiffness of the elastomeric apparatus 104 is increased. When the elastomeric apparatus 104 is placed within a typical autoclave curing thermal environment and elevated in temperature, a subsequent loss in (a total) magnetic force related to the magnetic Curie point reduces magnetic stiffness increasing flexibility of the elastomer housing 106 within the specific areas in which the magnets were placed. The Curie point or Curie temperature ($T_c$) is a temperature at which certain materials lose their permanent magnetic properties, which are replaced by induced magnetism. Materials have different structures of intrinsic magnetic moments that depend on temperature, and the Curie temperature is a critical point at which intrinsic magnetic moments of a material change direction. Higher temperatures make magnets weaker, as spontaneous magnetism only occurs below the Curie temperature. "Magnetic susceptibility" occurs above the Curie Temperature and can be calculated from the "Curie-Weiss Law" which is derived from Curie's Law.

Figure 14:
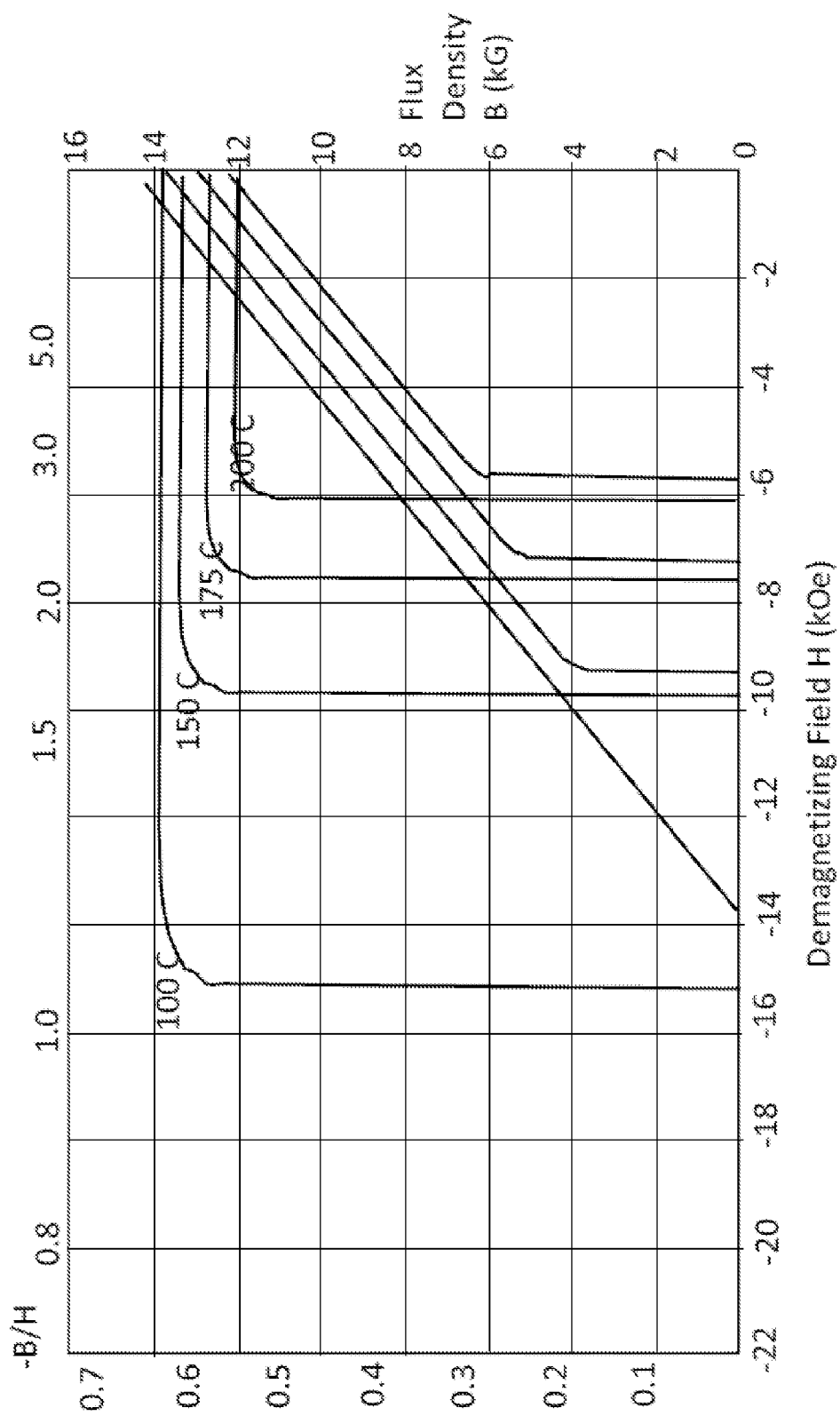
FIG. 14 illustrates an example neodymium-iron-boron magnetism loss curve, according to an example embodiment.

As described above, any number of materials may be used for the magnets. In one example, neodymium-iron-boron may be used. FIG. 14 illustrates an example neodymium-iron-boron magnetism loss curve, according to an example embodiment. As shown in FIG. 14, as temperature increases, magnetism of the material decreases. The temperature increase resulting in a loss of magnetism may also depend on geometry of the magnet (e.g., length to diameter ratio). Thus, materials used for magnets in the elastomeric apparatus 104 can be tuned to behave flexible at a desired temperature to some extent based on geometry of the magnets. Generally, materials for the magnets are chosen such that the elastomeric apparatus is rigid at about room temperature, and more flexible above room temperature. For neodymium-iron-born, a Curie temperature may be about 150° C., which also fits a general cure cycle for many composite parts. Thus, at the Curie temperature, the magnets lose magnetism. Some materials may exhibit reversibility in which once the temperature is reduced, magnetism is regained so that the elastomeric apparatus 104 returns to a rigid state.

In operation, the magnets of the elastomeric apparatus 104 provide stiffness in a cross-sectional area that may be beneficial during layup of composite material. For example, during automated lamination of composite materials, such as with automated fiber placement (AFP) process, the automated equipment exerts pressure on a typical bladder that can cause the bladder to deform and result in excess material being placed. However, use of the elastomeric apparatus 104 will allow the elastomeric apparatus 104 to be rigid during lamination so as to improve part quality and also allow the elastomeric apparatus 104 to be flexible during the curing cycle due to increased temperatures. It may be desirable to have the ability for the elastomeric apparatus 104 to become rigid during a time when AFP equipment is pressing on the elastomeric apparatus 104 to enable the composite material to be applied more efficiently without adding steps to the manufacturing process.

Figure 15:
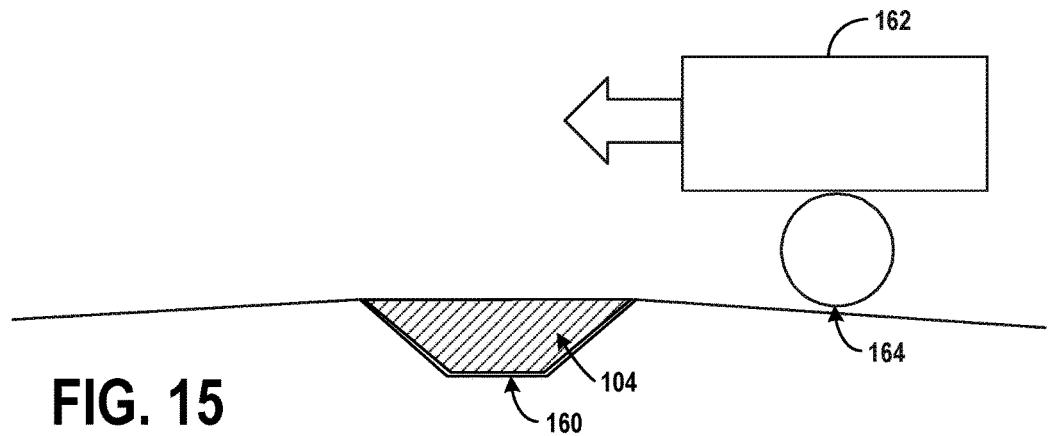
FIG. 15 illustrates an example method for altering a surface rigidity of an elastomeric apparatus for use in manufacture of a composite component, according to an example embodiment.
Figure 16:
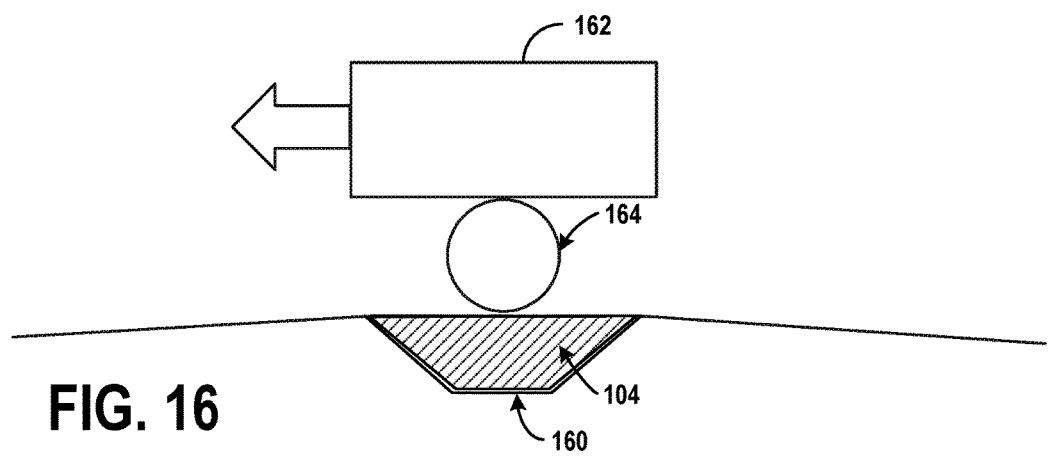
FIG. 16 illustrates another portion of the example method for altering a surface rigidity of an elastomeric apparatus for use in manufacture of a composite component, according to an example embodiment.
Figure 17:
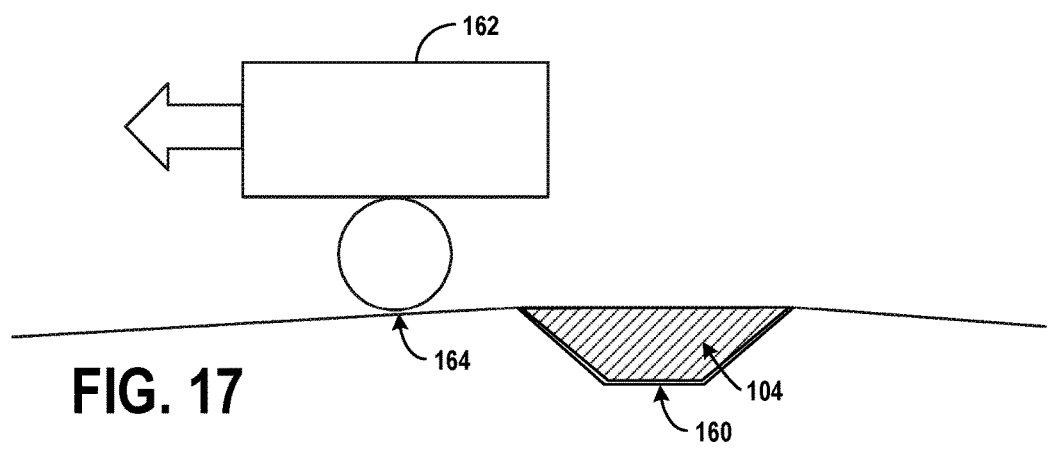
FIG. 17 illustrates another portion of the example method for altering a surface rigidity of an elastomeric apparatus for use in manufacture of a composite component, according to an example embodiment.

FIGS. 15-17 illustrate an example method for altering a surface rigidity of an elastomeric apparatus for use in manufacture of a composite component, according to an example embodiment. In FIG. 15, the elastomeric apparatus 104 is in a stringer trough 160, and an AFP machine head 162 that includes an AFP roller 164 for application of fibers moves across the stringer trough 160 with the elastomeric apparatus 104 inserted. As the AFP machine head 162 travels across the stringer trough 160, the magnets (not shown in FIGS. 15-17) in the elastomeric apparatus 104 provide surface rigidity for the elastomeric apparatus 104, which provides support for the stringer trough 160.

As shown in FIGS. 15-17, the rigid state of the elastomeric apparatus 104 is supportive of surface compaction applied by the AFP machine head 162 and AFP roller 164. During AFP fiber placement, the AFP roller 164 rolls over the stringer trough 160 and applies forces that may slightly deform the stringer trough 160. Using methods described herein though, the internal magnets of the elastomeric apparatus 104 can provide support to resist the force of the AFP roller 164. Examples forces applied by the AFP roller 164 may be about 100 PSI, or between about 0-200 PSI, during material application. Thus, the magnets may provide structure to the elastomeric apparatus 104 to resist such forces. An internal configuration of magnets in the elastomeric apparatus 104 may be optimized to provide directional stiffness or rigidity as needed depending on part configuration and the lamination process used.

Thus, within examples as shown in FIGS. 15-17, the elastomeric apparatus 104 may be configured into the rigid state during an entire lamination process, such as during operation of the AFP machine head 162 for application of multiple plies and multiple passes of the lamination device. The elastomeric apparatus 104 provides cross-section stiffness to the stringer trough 160.

Placement of the elastomeric apparatus 104 within the stringer trough 160 enables forming cavities in composite parts during part layup. Subsequently, during cure of the composite part, the elastomeric apparatus 104 expands to compress composite part laminates, and this is enabled by the elastomeric apparatus 104 becoming flexible with an increase in temperature during the cure cycle due to loss of the magnetic forces. Expansion is due to both thermal expansion and pressure differential inside the autoclave for curing of the composite parts. Thus, the aligned permanent magnets or magnet pieces embedded in the elastomeric apparatus 104 provide increased stiffness at low temperature for part layup and during cure at elevated temperatures the magnetic strength decreases, allowing the elastomeric apparatus 104 to be more flexible.

After cure, when temperature decreases, the magnetic strength may return (depending on a material used for the magnets) and the elastomeric apparatus 104 returns to original shape and stiffness. In such instances, the elastomeric apparatus 104 may need to be re-heated after cure to be placed into a flexible state for removal. Alternatively, certain magnets that completely lose their magnetism at elevated temperatures can be used to allow easier tool extraction, but would require re-magnetization prior to use in a next cycle. At cure temperatures, the magnetic field becomes distorted and magnetic properties are lost, but such magnetic properties are recoverable.

Figure 18:
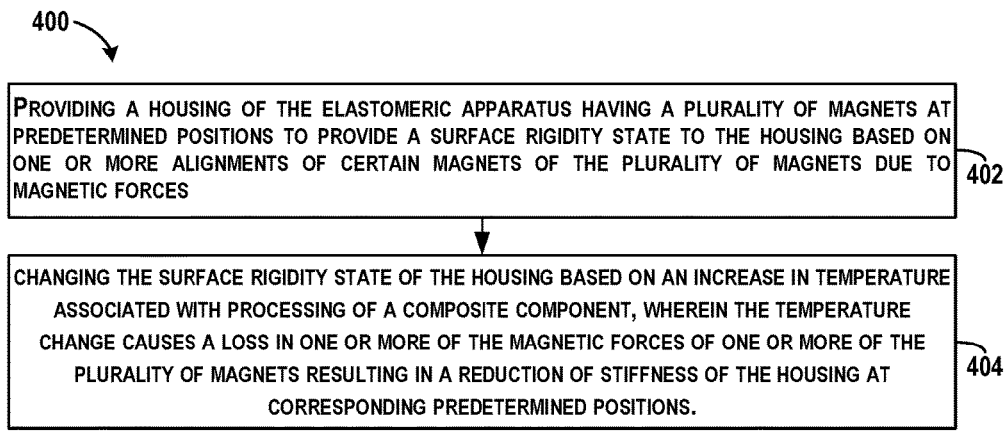
FIG. 18 shows a flowchart of an example method for altering a surface rigidity of an elastomeric apparatus for use in manufacture of a composite component, according to an example embodiment.

FIG. 18 shows a flowchart of an example method 400 for altering a surface rigidity of an elastomeric apparatus for use in manufacture of a composite component, according to an example embodiment. Method 400 shown in FIG. 18 presents an embodiment of a method that, for example, could be used by the system shown in FIG. 1, for example, and may be performed by components of the system in FIG. 1. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes providing the housing 106 of the elastomeric apparatus 104 having a plurality of magnets 108a-g at predetermined positions to provide a surface rigidity state to the housing 106 based on one or more alignments of certain magnets of the plurality of magnets 108a-g due to magnetic forces. The plurality of magnets 108a-g can be oriented within the housing 106 at the predetermined positions such that the one or more alignments are linearly parallel to the centerline 112 of the elastomeric apparatus 104 or linearly perpendicular to the centerline 112 of the elastomeric apparatus 104.

At block 404, the method 400 includes changing the surface rigidity state of the housing 106 based on an increase in temperature associated with processing of a composite component. The temperature change causes a loss in one or more of the magnetic forces of one or more of the plurality of magnets 108a-g resulting in a reduction of stiffness of the housing 106 at corresponding predetermined positions. The temperature change causes the loss in one or more of the magnetic forces of one or more of the plurality of magnets 108a-g related to a magnetic Curie point of a material of the plurality of magnets 108a-g. The surface rigidity state of the housing 106 is rigid at room temperature. In some examples, the increase in temperature associated with processing of the composite component is a result of autoclave cure of the composite component.

Figure 19:
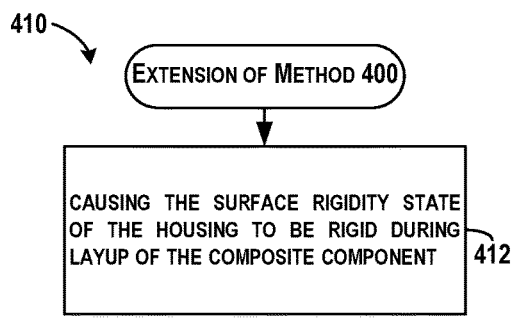
FIG. 19 shows a flowchart of another example method for altering a surface rigidity of the elastomeric apparatus, according to an example embodiment.

FIG. 19 shows a flowchart of another example method 410 for altering a surface rigidity of the elastomeric apparatus 104, according to an example embodiment. The method 410 may be performed in combination with or as an extension of the method 400 shown in FIG. 18, for example. At block 412, the method 410 includes causing the surface rigidity state of the housing 106 to be rigid during layup of the composite component. This may be performed due to the magnetic forces of the magnets 108a-g present in the elastomeric apparatus 104.

Figure 20:
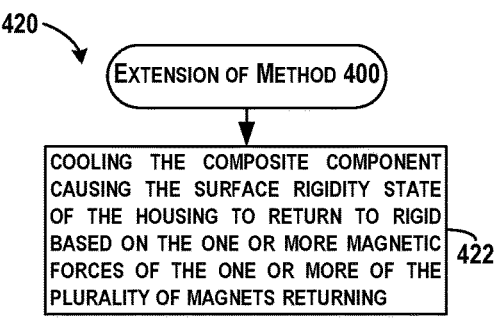
FIG. 20 shows a flowchart of another example method for altering a surface rigidity of the elastomeric apparatus, according to an example embodiment.

FIG. 20 shows a flowchart of another example method 420 for altering a surface rigidity of the elastomeric apparatus 104, according to an example embodiment. The method 420 may be performed in combination with or as an extension of the method 400 shown in FIG. 18, for example. At block 422, the method 420 includes cooling the composite component causing the surface rigidity state of the housing 106 to return to rigid based on the one or more magnetic forces of the one or more of the plurality of magnets 108a-g returning.

Figure 21:
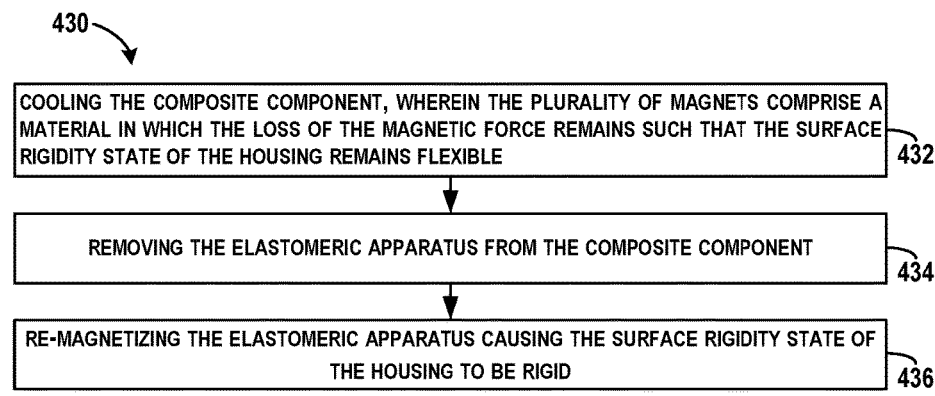
FIG. 21 shows a flowchart of another example method for altering a surface rigidity of the elastomeric apparatus, according to an example embodiment.

FIG. 21 shows a flowchart of another example method 430 for altering a surface rigidity of the elastomeric apparatus 104, according to an example embodiment. The method 430 may be performed in combination with or as an extension of the method 400 shown in FIG. 18, for example. At block 432, the method 430 includes cooling the composite component, and the plurality of magnets 108a-g comprise a material in which the loss of the magnetic force remains such that the surface rigidity state of the housing 106 remains flexible. At block 434, the method 430 includes removing the elastomeric apparatus 104 from the composite component. At block 436, the method 430 includes re-magnetizing the elastomeric apparatus 104 causing the surface rigidity state of the housing 106 to be rigid.

The magnetically stiffened, thermally sensitive elastomeric apparatus 104 may find use in a variety of potential applications, particularly in the transportation industry, including for example, aerospace, marine, automotive applications and other application where autoclave curing of composite parts may be used. As one specific example, embodiments of the disclosure may be used in the context of an aircraft manufacturing and service method, and an aircraft. Aircraft applications of the disclosed embodiments may include, for example, without limitation, curing of stiffener members such as, without limitation beams, spars and stringers, to name only a few.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An elastomeric apparatus for use in manufacture of a composite component, comprising:
   an elastomer housing having an inner surface and an interior wall; and
   a plurality of magnets within the elastomer housing at predetermined positions to provide surface rigidity to the elastomer housing based on one or more alignments of certain magnets of the plurality of magnets due to magnetic forces, wherein the plurality of magnets are arranged between the inner surface and the interior wall along a perimeter of the elastomer housing, wherein an increase in temperature causes a loss in one or more of the magnetic forces of one or more of the plurality of magnets resulting in a reduction of stiffness of the elastomer housing at corresponding predetermined positions, wherein a subsequent decrease in temperature causes an increase of stiffness of the elastomer housing based on the one or more of the magnetic forces of the one or more of the plurality of magnets returning.

2. The elastomeric apparatus of claim 1, wherein the increase in temperature causes the loss in one or more of the magnetic forces of one or more of the plurality of magnets related to a magnetic Curie point of a material of the plurality of magnets.

3. The elastomeric apparatus of claim 1, wherein the plurality of magnets provide the surface rigidity to the elastomer housing at room temperature.

4. The elastomeric apparatus of claim 1, wherein the plurality of magnets provide a stiff cross section of the elastomer housing at room temperature and a flexible cross section at elevated temperatures.

5. The elastomeric apparatus of claim 1, wherein the plurality of magnets comprise magnetic pieces of material embedded in the elastomer housing.

6. The elastomeric apparatus of claim 1, wherein the plurality of magnets are oriented within the elastomer housing at the predetermined positions such that the one or more alignments provide a rigid cross section of the elastomeric apparatus.

7. The elastomeric apparatus of claim 1, wherein the plurality of magnets are oriented within the elastomer housing at the predetermined positions such that the one or more alignments are linearly parallel to a centerline of the elastomeric apparatus.

8. The elastomeric apparatus of claim 1, wherein the plurality of magnets are oriented within the elastomer housing at the predetermined positions such that the one or more alignments are linearly perpendicular to a centerline of the elastomeric apparatus.

9. The elastomeric apparatus of claim 8, further comprising additional magnets oriented within the elastomer housing at additional predetermined positions forming additional alignments that are linearly parallel to a centerline of the elastomeric apparatus, wherein the additional magnets forming the linearly parallel alignments are provided between the plurality of magnets forming the linearly perpendicular alignments.

10. The elastomeric apparatus of claim 8, further comprising additional magnets oriented within the elastomer housing at additional predetermined positions forming additional alignments that are diagonal to a centerline of the elastomeric apparatus, wherein the additional magnets forming the diagonal alignments are provided between the plurality of magnets forming the linearly perpendicular alignments.

11. The elastomeric apparatus of claim 1, wherein elastomer housing includes an outer surface, and wherein the plurality of magnets are included within the elastomer housing along the outer surface of the elastomer housing.

12. The elastomeric apparatus of claim 1, wherein elastomer housing includes an outer surface, and wherein the plurality of magnets are included within the elastomer housing along the inner surface and along the outer surface of the elastomer housing.

13. The elastomeric apparatus of claim 1, wherein the plurality of magnets are arranged with poles all pointing in the same direction.

14. The elastomeric apparatus of claim 1, wherein the elastomer housing includes one or more vents to provide airflow within the elastomer housing.

15. The elastomeric apparatus of claim 1, wherein the plurality of magnets provide the surface rigidity to the elastomer housing at temperatures in a range of about 65° F. to about 75° F.

16. The elastomeric apparatus of claim 1, wherein the increase in temperature to about 150° C. causes the loss in one or more of the magnetic forces of one or more of the plurality of magnets.

17. The elastomeric apparatus of claim 1, wherein elastomer housing includes an outer surface, and wherein the plurality of magnets are included within the elastomer housing along only one of the inner surface and the outer surface of the elastomer housing.

18. The elastomeric apparatus of claim 1, wherein the plurality of magnets are arranged in horizontal rows in the elastomer housing.

19. The elastomeric apparatus of claim 1, wherein between the horizontal rows of the plurality of magnets are elastomer only regions.

20. The elastomeric apparatus of claim 1, wherein the plurality of magnets comprise neodymium-iron-boron.

* * * * *